United States Patent [19]

Lee et al.

[11] Patent Number: 5,009,957

[45] Date of Patent: Apr. 23, 1991

[54] MICROENCAPSULATED PLATINUM-GROUP METALS AND COMPOUNDS THEREOF

[75] Inventors: Chi-Long Lee; Robin L. Willis, Jr., both of Midland, Mich.

[73] Assignee: Dow Corning Corporation, Midland, Mich.

[21] Appl. No.: 327,652

[22] Filed: Mar. 23, 1989

Related U.S. Application Data

[62] Division of Ser. No. 75,789, Jul. 20, 1987, Pat. No. 4,874,667.

[51] Int. Cl.$^5$ .................. B32B 27/00; B32B 9/04; B32B 25/00
[52] U.S. Cl. .................. 428/402.22; 264/47; 427/213.34; 427/213.36; 428/402.21; 428/402.24; 528/15; 528/491; 528/901
[58] Field of Search .............. 428/402.21, 402.22, 428/402.24; 427/213.34, 213.36; 528/15, 491, 901; 264/4.7

[56] References Cited

U.S. PATENT DOCUMENTS

| 4,766,176 | 8/1988 | Lee et al. | 528/15 |
| 4,874,667 | 10/1989 | Lee et al. | 428/402.21 |

*Primary Examiner*—Herbert J. Lilling
*Attorney, Agent, or Firm*—Robert Spector

[57] ABSTRACT

Platinum-group metals and compounds thereof are microencapsulated within one or two layers of thermoplastic organic polymers. The layer or layers are deposited using known prior art microencapsulation techniques. The microcapsules can be incorporated into storage-stable one-part polyorganosiloxane compositions that cure by a platinum-catalyzed hydrosilation reaction.

8 Claims, No Drawings

MICROENCAPSULATED PLATINUM-GROUP METALS AND COMPOUNDS THEREOF

This is a divisional of co-pending application Ser. No. 075,789 filed on 7/20/87, now U.S. Pat. No. 4,874,667.

BACKGROUND OF THE INVENTION

1. Field of the Invention

This invention relates to microencapsulated materials. More particularly, this invention relates to novel microencapsulated platinum-group metals and compounds thereof. These metals and compounds are encapsulated within one or two layers of a thermoplastic organic polymer. A preferred use for these encapsulated materials is as catalysts for storage stable, heat curable one-part organosiloxane compositions that cure by a hydrosilation reaction and exhibit long term storage stability under ambient conditions.

2. Description of the Prior Art

One of the most useful classes of polyorganosiloxane compositions cure by a platinum catalyzed hydrosilation reaction. The advantages of these compositions relative to moisture curable compositions is their rapid curing rate, particularly at temperatures above about 50 degrees C., and their ability to cure in thick sections. Compositions that cure by a hydrosilation reaction typically contain a polydiorganosiloxane with at least two ethylenically unsaturated hydrocarbon radical per molecule, an organohydrogensiloxane containing at least two silicon-bonded hydrogen atoms per molecule in an amount sufficient to achieve curing of the composition and a platinum-containing catalyst in an amount sufficient to promote curing of the composition. Fillers and other additives may be present for the purpose of modifying physical and/or chemical properties of the composition either prior to or following curing.

Because the aforementioned platinum catalyzed organosiloxane compositions begin to cure even at ambient temperature once the reactants are combined, the platinum catalyst and the organohydrogensiloxane reactant usually are packaged in separate containers and are not combined until it is desired to cure the composition. Even if the composition contains one or more of the known platinum catalyst inhibitors it cannot be stored in a single container for more than a few hours.

One of the alternatives proposed in the prior art to supplying platinum-catalyzed curable organosiloxane compositions as two-package materials is to isolate either the catalyst or the organohydrogensiloxane within a matrix of a material that is solid under the conditions encountered during storage of the curable composition, and which allows the entrapped reactant or catalyst to escape and mix with the other ingredients when it is desired to cure the composition.

U.S. Pat. No. 4,481,341, which issued to Schlak et al. on Nov. 6, 1984 describes thermosetting organosiloxane compositions comprising a polyorganosiloxane containing at least two ethylenically unsaturated hydrocarbon radicals per molecule, a polyorganohydrogensiloxane containing at least two silicon bonded hydrogen atoms per molecule and a platinum-containing catalyst that is dispersed in a finely divided, solid material, such as a silicone resin, at a concentration of from 0.001 to 5 percent by weight of platinum metal.

The finely divided material in which the catalyst is dispersed is virtually insoluble in either the aforementioned polyorganosiloxane or polyorganohydrogensiloxane and melts or softens at a temperature between 70 and 250 degrees C. The alleged advantage of these compositions disclosed by Schlack et al. is that the catalyst remains isolated from the other ingredients of the curable composition until the composition is heated sufficiently to melt the material in which the catalyst is dispersed. Because the organosilicon compounds present in the composition will not cure in the absence of the catalyst, the composition can allegedly be stored for long periods of time without undergoing curing or even an increase in viscosity.

A disadvantage of the curable organosiloxane compositions described by Schlak et al. is the presence of an incompatible resin in the curable composition. The maximum platinum content disclosed for the catalyst/resin mixture is 5 percent by weight, and is 0.1 percent in the single exemplified composition. The catalyst mixture is prepared by combining 100 parts by weight of a solubilized silicone resin with 10 parts of a solution of the platinum catalyst in isopropanol. The solution contains 1 percent by weight of the catalyst, based on the platinum metal content. This requires a relatively large amount of resinous carrier material in addition to the catalyst. By definition the carrier is insoluble in the other organosilicon compounds present in the composition. The carrier may therefore detract from the appearance or properties of the cured material.

A second potential disadvantage of Schlack et al. catalyst resides in the method used to prepare the catalyst composition. A solid block or sheet of resin with the platinum-containing material dispersed throughout is ground to a fine powder. The random nature of the grinding operation makes it possible that some of the particles will contain platinum catalyst on their surface. Even trace amounts of platinum have been shown to cause premature curing of the type of organosiloxane composition exemplified in this patent.

One way to avoid the inherent disadvantages of the catalyst compositions described in the Schlack et al. patent, is to completely microencapsulate finely divided particles or droplets of a catalyst composition within a material that is impermeable to the catalyst and effectively isolates it from the reactive ingredients of a curable organosiloxane composition. The encapsulant melts or softens at the desired curing temperature of the composition. A variety of methods for microencapsulating materials are known in the art.

The prior art discloses one-part curable organosiloxane compositions containing microencapsulated reactants or catalysts. One example of this type of art is U.S. Pat. No. 4,528,354, which issued to McDougal and Dougherty on July 9, 1985. This patent teaches a method for curing one-part peroxide curable silicone rubber compositions. A liquid phase containing an organic peroxide is encapsulated within a shell of a resinous thermosetting material that is impervious to the peroxide. The capsules are designed to rupture under a given internal vapor pressure that is generated by the encapsulated liquid when a curable composition containing the microcapsules is heated.

Because release of the peroxide is dependent upon rupturing rather than melting of the shell separating the peroxide from the other ingredients of the organosiloxane composition, the composition and thickness of the shell must be carefully controlled to ensure that rupture of the capsules will occur reproducibly within the temperature range used to cure the organosiloxane composition.

European Published Patent Application No. 140,770 which issued on May 8, 1985 describes storage stable polyorganosiloxane compositions comprising a polyhydroxylated polysiloxane, a polyacyloxysilane and a microencapsulated accelerator. The coating material of the microcapsules can only be penetrated using heat and/or irradiation. Suitable encapsulating materials include polystyrene, acrylonitrile-styrene copolymers, and polymethyl methacrylate. This publication does not suggest using microencapsulated materials in organosiloxane compositions curable by means other than the reaction of polyhydroxylated polyorganosiloxanes with acyloxysilanes.

U.S. Pat. No. 4,293,677, which issued to Imai on Oct. 6, 1981 describes encapsulating organohydrogensiloxanes using complex coacervation and in-situ polymerization, two of the most common microencapsulation techniques. In accordance with example 1 of this patent, an aqueous gelatin solution adjusted to a pH of 9.5 was added to a solution of a trimethylsiloxy terminated polymethylhydrogensiloxane in molten paraffin wax. A 10 percent by weight solution of gum arabic is then added and the pH of the resultant emulsion is adjusted to 4 over a period of two hours to precipitate a mixture of the two polyelectrolytes that forms the encapsulant. The encapsulant is cured by gradually heating the dispersion of coated particles to a temperature of 50 degrees C.

The in-situ polymerization process exemplified in Example 2 of the Imai patent involves the polymerization of styrene in the presence of a dimethylsiloxane/methylhydrogensiloxane copolymer as the dispersed phase of an emulsion wherein the aqueous phase contains a solubilized polyvinyl alcohol and potassium persulfate.

A disadvantage of encapsulating the organohydrogensiloxane reactant as taught by Imai et al. is the relatively large amount of encapsulating polymer that is introduced into the composition. Many of the thermoplastic organic polymers suitable for use as encapsulants are incompatible with the reactants present in the curable composition. As mentioned hereinbefore in connection with the Schlack patent, the presence of relatively large amounts of an incompatible polymer may detract from the appearance, physical properties and optical properties of the cured material.

The amount of incompatible encapsulating polymer introduced into a curable composition can be reduced by encapsulating the platinum-containing catalyst rather than the organohydrogensiloxane reactant as taught by Imai et al. One of the most effective classes of platinum-containing catalysts for curing organosiloxane compositions of the type described in the Imai et al. patent are reaction products of an inorganic platinum compound such as hexachloroplatinic acid with liquid vinyl-containing organosilicon compounds such as sym-tetramethyldivinyldisiloxane. The resultant product is used as such or diluted to the desired platinum content using a liquid dimethylvinylsiloxy terminated polydimethylsiloxane.

When the present inventors attempted to microencapsulate one of these preferred platinum catalyst compositions by combining the composition with a solution of polystyrene in a water immiscible liquid, emulsifying the resultant composition in water and then evaporating the water immiscible liquid to precipitate the polystyrene as a coating around the droplets of catalyst composition, the resultant microcapsules were agglomerated and could not be isolated as a free flowing powder.

Washing the microcapsules with organic solvents such as toluene and methanol did little to reduce the extent of agglomeration. Curable organosiloxane compositions containing these microcapsules, a vinyl-containing liquid polydimethylsiloxane and a dimethylsiloxane/methylhydrogensiloxane copolymer exhibited very poor storage stability under ambient conditions, indicating that some catalyst was either initially present on the surface of the microcapsules or had diffused through the encapsulant during storage of the curable composition.

The present inventors continued their investigations with the objective of preparing microencapsulated platinum-containing catalysts using a minimal amount of encapsulting polymer to form a product that could be isolated as a free flowing powder with substantially no catalyst present on the surface of the microcapsules. A second objective was to utilize these catalysts in a one-part organosiloxane composition capable of being stored for one year or longer at temperatures of up to 50 degrees C. while curing rapidly at temperatures above the melting or softening point of the encapsulant.

SUMMARY OF THE INVENTION

Platinum-group metals and compounds thereof are microencapsulated within one or two layers of thermoplastic organic polymers. The polymers are deposited on the finely divided metal or compound using known microencapsulation techniques. The microcapsules are in the form of a free flowing powder. A preferred use for these microencapsulated materials is as catalysts for storage-stable one-part polyorganosiloxane compositions that cure by a platinum-catalyzed hydrosilation reaction.

DETAILED DESCRIPTION OF THE INVENTION

This invention provides a microencapsulated platinum-group metal or compound thereof in the form of a free flowing powder consisting essentially of microcapsules that, in turn, comprise said metal or compound as finely divided particles or droplets that are completely enveloped within one or two layers of thermoplastic organic polymer, the average diameter of said microcapsules is less than 500 microns, and the thermoplastic polymers constitute at least 50 percent of the weight of said microcapsules.

The microencapsulated material comprises any of the platinum-group metals and compounds thereof. These materials include but are not limited to finely divided platinum or other platinum group metal deposited on carbon black and compounds of platinum group metals. For purposes of convenience the materials encapsulated in accordance with the present invention are referred to hereinafter as platinum and platinum compounds or as platinum-containing materials.

If the microencapsulated platinum-containing materials of this invention are used as hydrosilation catalysts, preferred encapsulants include reaction products and complexes of inorganic compounds of platinum, particularly halogen compounds, with organosilicon compounds, because these materials are compatible with the reactants present in curable organosiloxane compositions The platinum-containing material can be a liquid or solid at ambient temperature. Solid materials can be encapsulated in this form or dissolved in a solvent that will not dissolve the encapsulating polymer. To increase the density of the microcapsule, it can be prepared by treating a finely divided solid such as silica or quartz with a compound of a platinum-group metal in liquid or solubilized form.

The particles or droplets of platinum-containing material are completely enveloped within one or two layers of thermoplastic organic polymers. The encapsulated material can be distributed throughout the volume of the microcapsule or can be concentrated in one or more "core" areas. If there are two layers of encapsulating polymers, the polymers are preferably not identical.

The thermoplastic polymer or polymers in which the platinum-containing material is encapsulated is insoluble in and impervious to the platinum-containing material. In addition, if the microencapsulated product is to be used as a hydrosilation catalyst in a curable polyorganosiloxane composition, the encapsulating polymer(s) must be insoluble in the curable composition.

Polymers useful as encapsulants for the present microcapsules include but are not limited to addition type polymers such as polyethylene, polystyrene, polyvinyl chloride, polyvinylidene chloride, copolymers of vinyl chloride and vinylidene chloride, polyacrylates such as polymethyl methacrylate, polyacrylonitrile and copolymers of acrylonitrile with butadiene and/or styrene. Suitable condensation type polymers include but are not limited to polyamides and polyesters. Cellulose esters such as cellulose acetate and mixed esters such as cellulose acetate butyrate can also be used.

It will be understood that "insolubility" and "impermeability" are relative terms. Many solids will dissolve to a very limited extent in liquids in which they are considered insoluble, just as a limited degree of diffusion of a material through an "impermeable" layer will occur, given sufficient time. As used herein the terms "insoluble" and "impermeable" imply that the amount of encapsulant that dissolves in the encapsulated material and/or the curable composition and the amount of encapsulated material that diffuses through the walls of the microcapsules during storage of the curable organosiloxane composition are insufficient to cause curing of the composition. In some instances a slight increase in the viscosity during storage will be observed.

In order for the present microencapsulated platinum-containing material to function effectively in organosiloxane compositions that cure by a platinum catalyzed hydrosilation reaction, the platinum-containing material must be able to penetrate the encapsulating polymer at the desired curing temperature of the organosiloxane composition.

The present microcapsules are essentially spherical in contour with diameters of up to 500 microns. Diameters of less than 50 microns are preferred because they are more readily incorporated into curable organosiloxane compositions. Depending upon the method used to prepare the microcapsules, they can deviate from this contour at one or more locations around their perimeter, particularly if the encapsulated material is a solid particle such as quartz that was treated with a liquid or solubilized platinum compound prior to being encapsulated.

If the microcapsule contains two layers of encapsulating polymers, the outer layer typically forms a shell around an inner polymer layer that completely envelopes the encapsulated platinum-containing material.

The thermoplastic organic polymer(s) serving as the encapsulant constitutes at least 50 percent by weight of the microcapsules. The microcapsules, in turn, include the encapsulating polymer(s) and the platinum-containing material together with any liquids used to dissolve and/or dilute the platinum-containing material. Preferably the weight of the thermoplastic polymer constitutes at least 70 percent by weight of the microcapsule.

It has been found that it is not feasible to encapsulate all of the platinum-containing material and any associated liquids using conventional microencapsulation methods when the encapsulating polymers constitute less than 50 percent by weight of the microcapsules. The excess platinum-containing material typically collects on the surface of the capsules, and often results in premature curing of organosiloxane compositions containing these encapsulated catalysts. Even if the excess platinum-containing material is removed by washing with a suitable solvent for this material, the layer of encapsulating polymer may not be of sufficient thickness to prevent diffusion of platinum-containing material from the interior to the surface of the microcapsule.

The one or two layers of encapsulating polymer can be deposited on a finely divided form of the platinum-containing material using any of the chemical, physicochemical or physical methods described in the aforementioned prior art and summarized hereinafter.

Chemical methods for microencapsulation are described in U.S. Pat. No. 3,859,228, which issued to Morishita et al. on Jan. 7, 1975: U.S. Pat. No. 4,462,982, which issued to Samejima et al. on July 31, 1984: British Patent No. 1,354,694, which issued on May 30, 1974; U.S. Pat. No. 4,411 933, which issued to Samejima et al. on Oct.25, 1983: U.S. Pat. No. 4,402,856, which issued to Schnoering et al. on Sept. 6, 1983: U.S. Pat. No. 4,542,042, which issued to Samejima et al. on Sept. 17, 1985: U.S. Pat. No. 3,886,084, which issued to Vassiliades on May 27, 1975; and U.S. Pat. No. 4,181,639, which issued on Jan. 1, 1980.

U.S. Pat. No. 3,523,906, which issued to Alois and Nicolas on Aug. 11, 1970, describes a microencapsulation method using a preformed polymer as the encapsulant. The solubilized encapsulant is emulsified in an aqueous medium containing a hydrophilic colloid. The encapsulant can be any vinyl polymer or copolymer, a polycarbonate, polyester, polysulfonate, polyurethane, polyamide, chlorinated natural rubber or a cellulose derivative that is soluble in a water immiscible solvent forms a dry, solid, water insoluble film in the solvent-free state.

U.S. Pat. No. 4,389,330, which issued to Tice and Lewis on June 21, 1983 discloses a microencapsulation process whereby an active agent is dissolved or dispersed in a solvent and the encapsulating material is dissolved in the same solvent. The solvent containing the active agent and encapsulant is then dispersed in a continuous phase processing medium and a portion of the solvent is evaporated to precipitate the encapsulant around the active ingredient in the form of microcapsules suspended in the aforementioned continuous phase. The novel feature of this method resides in extracting the remainder of the solvent at this stage, i.e. after the microcapsules have been formed and remain suspended in the continuous medium in which they are formed.

Microencapsulated materials can also be formed by mechanical means that typically set the solid particles to be encapsulated in motion by centrifugal force or air currents in a fluidized bed reactor. The particles are directed through a film or spray of molten or solubilized encapsulant.

One of the physico-chemical methods for preparing microcapsules is coacervation, which is typically a three step process. In the first step a liquid vehicle forms the continuous phase, and at least one polyelectrolyte in liquified form together with the material to be encapsulated forms the dispersed phase. The liquid vehicle initially contains the solubilized encapsulant that is subsequently phased out of solution as a liquid coacervate to form a three-phase system. In a simple coacervation process the encapsulant is a single polyelectrolyte such as gelatin. Complex coacervation involves using two polyelectrolytes of opposite charge, such as gelatin and gum arabic, that are concurrently phased out of solution.

The phasing out of a simple coacervate can be accomplished in a number of ways, including changing the temperature of the system, or by addition of a salt or a non-solvent for the encapsulant. In a complex coacervation process the encapsulant can be precipitated by changing the pH of the composition.

The second step of a coacervation process involves deposition of the encapsulant phase around droplets or solid particles of the material to be encapsulated. For this to occur, there must be a driving force for adsorption of the encapsulant at the surface of the material to be encapsulated.

During the third step of the process the encapsulant is solidified. The means for accomplishing this can be a continuation of the one used to bring about separation of the encapsulant during the second step of the process, or the encapsulant can be solidified by chemical means, including cross linking, chelation or grafting. The resultant particles of encapsulated material can be isolated by conventional filtration and drying techniques. The size of the particles and the thickness of the coating is a function of several variables, including the relative concentrations of encapsulant and substrate and the rate of stirring during the coacervation process.

One of the chemical methods for preparing a microencapsulated material involves an in-situ polymerization of at least one monomer on the surface of a finely divided platinum- containing material in the form of solid particles or droplets. The monomer can be an ethylenically unsaturated organic monomer such as ethylene, styrene, vinyl chloride, vinylidene chloride, or an ester of acrylic or methacrylic acid such as methyl methacrylate. Mixtures containing two or more of these ethylenically unsaturated monomers can be used, depending upon the physical and chemical properties desired for the encapsulant. Preferred monomer mixtures include mixtures of styrene and acrylonitrile, and mixtures of vinylidine chloride with other ethylenically unsaturated monomers.

Alternatively, the polymerization reaction used to prepare the encapsulating polymer(s) can involve a condensation reaction between two or more monomers or a single cyclic monomer such as a lactone or lactam. An example of such a condensation polymerization is the interfacial reaction between sebacoyl chloride and hexamethylene diamine to form a polyamide.

At least one of the condensable monomers together with the particles or droplets to be encapsulated are emulsified in an aqueous medium, which may also contain a catalyst for the polymerization. Depending upon the type of monomer(s) selected, formation of the encapsulating polymer is effected by heating, exposure to ultraviolet or other type of radiation, or allowing the reactants of a condensation polymerization to contact one another in the presence of an appropriate catalyst.

One of the preferred methods for forming the one or two layers of thermoplastic organic polymers present in the microencapsulated materials of this invention is a physico-chemical one whereby a thermoplastic organic polymer in solubilized form is precipitated from an emulsion that also contains the platinum-containing material as part of the dispersed phase. During the first step of this method the platinum- containing material in finely divided form is dispersed in a solution of the encapsulant polymer. Preferred polymers are those formed from the monomers discussed hereinabove in connection with the in-situ polymerization method for forming microcapsules.

The platinum-containing material can be a solid or a liquid. Liquids can optionally be adsorbed or absorbed on the surface of a solid particle such as silica.

The solvent for the encapsulating polymer must be immiscible with the continuous phase of the emulsion, which can be water, an organic liquid or a liquid polyorganosiloxane. In addition, the boiling point of either the encapsulant solvent alone or an azeotropic mixture of this solvent and the continuous phase of the emulsion must be below the melting point of the encapsulating polymer.

The dispersion of platinum-containing material in the solubilized encapsulating polymer is then emulsified in the continuous phase and the encapsulant solvent is removed by evaporation. Depending upon the boiling point of the solvent, evaporation can be achieved at ambient temperature by stirring the emulsion while passing an inert gas such as nitrogen through the reactor. Removal of higher boiling solvents such as toluene may require heating the emulsion under ambient or reduced pressure. The process conditions during evaporation of the encapsulant solvent are such that the encapsulant precipitates as a film around each of the suspended particles.

The method for microencapsulating a platinum-containing material with a preformed, solubilized thermoplastic polymer typically comprises the following series of steps:

A. emulsifying or dispersing in the continuous phase liquid (1) a finely divided form of the platinum-containing material as particles or droplets and (2) a solution of the encapsulant in a liquid that is immiscible with the continuous phase, the weight of encapsulant being at least equal to the weight of platinum-containing material.

B. evaporating an amount of encapsulant solvent sufficient to precipitate the encapsulant as a coating around substantially all the particles or droplets of platinum- containing material, and C. solidifying and recovering the resultant microcapsules.

To ensure the substantial absence of platinum on the outer surface of microencapsulated platinum compounds prepared using any of the aforementioned methods, after the encapsulating polymer has been applied the microcapsules are preferably washed with a solvent for the platinum compound that will not dissolve the encapsulating polymer. It has been found that even trace amounts of platinum on the surface of the microcapsule can result in premature curing of organosiloxane compositions containing the microencapsulated platinum-containing materials of this invention.

If the platinum compound is one of the preferred reaction products of hexachloroplatinic acid with an ethylenically unsaturated liquid organosilicon compound such as a sym-tetraalkyldivinyldisiloxane, the liquid used to wash the microcapsules is preferably a liquid cyclic or linear polydialkylsiloxane that is a solvent for the platinum compound but not the encapsulant. Most preferably the alkyl radicals on both the reactant and the washing liquid are methyl.

When water is used as the continuous phase of the emulsion from which the encapsulating polymer is precipitated, the continuous phase can contain a surfactant or an emulsifying agent such as polyvinyl alcohol to facilitate formation of the emulsion. The surfactant selected should be one that does not react with or inhibit the catalytic activity of the platinum containing material. For example, surfactants containing amino or mercapto groups should not be used, because these groups are known to inhibit platinum-containing hydrosilation catalysts.

Microencapsulated platinum-containing materials having average particle sizes of from 5 to about 150 microns or higher can be prepared by mechanical means. In accordance with one such method particles of a finely divided solid such as silica are treated with a liquid or solubilized platinum compound. The treated particles are then suspended in a fluidized bed reactor and circulated through a finely divided spray of the solubilized polymer that will form the coating layer or a polymerizable precursor thereof. The particles are exposed to the spray until a coating of the desired thickness is achieved.

If the microcapsule contains two layers of encapsulating polymer, each of the layers can be prepared using any of the foregoing techniques.

The microencapsulated platinum-containing materials of this invention are particularly suitable for use as hydrosilation catalysts in one-part, storage stable organosiloxane compositions. In addition to the microencapsulated catalyst the compositions comprise (A) a polyorganosiloxane containing at least two ethylenically unsaturated hydrocarbon radicals per molecule and (B) a polyorganohydrogensiloxane containing at least two silicon-bonded hydrogen atoms per molecule. To ensure adequate crosslinking and an acceptable level of physical properties the sum of the average number of ethylenically unsaturated hydrocarbon radicals per molecule of polyorganosiloxane and the average number of silicon-bonded hydrogen atoms per molecule of polyorganohydrogensiloxane is greater than 4.

The polyorganosiloxane containing at least two ethylenically unsaturated hydrocarbon radicals per molecule, referred to hereinbefore as (A), can be any of those typically used in organosiloxane compositions that are curable by a platinum-catalyzed hydrosilation reaction, (A) can be a liquid, a paste or a high viscosity gum and consists at least in part of diorganovinylsiloxy or organovinylsiloxane units. At least a portion of the repeating units of (A) preferably contain silicon-bonded methyl radicals.

The diorganovinylsiloxy group preferably contains a vinyl radical and two methyl radicals bonded to silicon or a vinyl, a phenyl and a methyl radical bonded to silicon.

In one preferred embodiment the viscosity of (A) is from 1 to 500 Pa.s. Polymers of this type are well known and commercially available. A preferred embodiment of (A) is a polydiorganosiloxane containing at least one monoorganosiloxane unit per molecule, resulting in branching of the polymer molecule. Polymers of this type are described in U.S. Pat. No. 3,284,406 to Nelson, which issued on Nov. 8, 1966.

Alternatively (A) can be a gum exhibiting a viscosity of 1000 Pa.s or greater at 25 degrees C. Ingredient (A) is cured by a hydrosilation reaction between the ethylenically unsaturated hydrocarbon radicals of this ingredient and the silicon-bonded hydrogen atoms of the curing agent (B).

Ingredient (B) is an organohydrogensiloxane containing an average of at least three silicon-bonded hydrogen atoms per molecule. It can contain from as few as four silicon atoms per molecule up to an average of 20 or more, and exhibit a viscosity of up to 10 Pa.s or higher at 25 degrees C. Ingredient B contains repeating units of the formulae $HSiOR'_{1.5}$, $R'HSiO$ and/or $R'_2HSiO_{0.5}$. The molecules of this ingredient may also include one or more monoorganosiloxane, diorganosiloxane, triorganosiloxy and $SiO_2$ units that do not contain silicon-bonded hydrogen atoms. In these formulae R' is a monovalent hydrocarbon radical as defined hereinabove for the R radical of ingredient (A). Alternatively, ingredient (B) can be a cyclic compound containing diorganosiloxane and organohydrogensiloxane units, or a compound of the formula $Si(OSiR'_2H)_4$.

Most preferably R' is methyl and ingredient (B) is a linear trimethylsiloxy terminated polymethylhydrogensiloxane or a dimethylsiloxane/methylhydrogensiloxane copolymer containing an average of from 10 to about 50 repeating units per molecule of which from 3 to 5 are methylhydrogensiloxane.

The molecular weights of ingredients (A) and (B) together with the number and distribution of the silicon-bonded hydrogen atoms and ethylenically unsaturated hydrocarbon radicals within these ingredients will determine the location of crosslinks in the cured elastomer. The concentration of crosslinks per unit volume is often referred to as the "crosslink density" and determines certain physical properties of the cured elastomer, particularly hardness, tensile strength and elongation. The particular combinations of polydiorganosiloxane(s) and curing agent(s) yielding the desired combination of physical properties can readily be determined by routine experimentation with a knowledge of this invention.

The molar ratio of silicon bonded hydrogen atoms to vinyl or other ethylenically unsaturated hydrocarbon radicals present in the curable compositions of this invention is a major factor in determining the properties of the cured elastomer. Because of the difficulty often experienced in achieving a complete reaction between all of the silicon bonded hydrogen atoms and all of the vinyl or other ethylenically unsaturated hydrocarbon radicals present in the reaction mixture, it is desirable to have an stoichiometric excess of one of these species in a curable composition. A ratio of from 1.0 to 1.6 silicon-bonded hydrogen atoms per vinyl or other ethylenically unsaturated hydrocarbon radical has been found to yield optimum combinations of properties. The preferred ratio for a given composition will be determined at least in part by the average molecular weight of ingredient (A) and the type of curing agent.

The following examples describe preferred embodiments of the microencapsulated platinum-group metals and compounds thereof and one-part curable organosiloxane compositions containing these preferred materials as hydrosilation catalysts, and should not be interpreted as limiting the scope of the invention defined in the accompanying claims. Unless otherwise specified all parts and percentages are by weight and all viscosities were measured at 25 degrees C.

EXAMPLE 1

This example describes the preparation of a microencapsulated platinum compound of this invention by precipitating a coating of polystyrene around a preferred type of platinum catalyst. The platinum compound was prepared by reacting hexachloroplatinic acid and sym-tetramethyldivinyldisiloxane and diluting the reaction product with a liquid dimethylvinylsiloxy terminated polydimethylsiloxane to achieve a platinum content of 0.7 percent. This example also demonstrates the importance of washing the microcapsules with a solvent for the platinum compound prior to incorporating the microcapsules in a curable organosiloxane composition.

A reactor equipped with a mechanically operated stirrer and nitrogen inlet was charged with 300 cc. of water and 15 g. of a partially hydrolyzed polyvinyl alcohol available as Vinol 205 from Air Products Company. This mixture was stirred until the polyvinyl alcohol dissolved, at which time a solution containing 2.67 g. of the platinum catalyst, 17.33 grams of polystyrene and 300 cc of methylene chloride was gradually added over a period of one half hour. Following completion of the addition the mixture in the reactor was stirred using a stirrer speed of 400 r.p.m. for one hour, at which time 2000 cc of water was added to reduce foaming. This mixture was stirred for 15 ¼ hours under ambient conditions while passing a stream of nitrogen through the reactor, after which the contents of the reactor were heated at 40 degrees C. for 8 ¾ hours while maintaining the flow of nitrogen, and were then allowed to remain under ambient conditions for about 16 hours.

This mixture was then centrifuged to concentrate the microcapsules which had formed. The microcapsules were isolated by filtration, washed once with water, twice with methanol, and then allowed to dry for one day. A portion of the microcapsules were retained as sample 1 for incorporation into a curable organosiloxane composition.

The remainder of the microcapsules were combined with cyclic polydimethylsiloxanes, a known solvent for the platinum compound, stirred for two hours, and then isolated from the liquid. The resultant capsules, referred to herein as sample 2, contained 70.8 percent of polystyrene and 29.2 percent of the platinum compound, equivalent to 0.184 percent platinum metal.

A one-part curable organosiloxane composition of this invention was prepared by blending the following ingredients to homogeneity:
14.3 parts of a liquid polyorganosiloxane (A) containing the following repeating units, expressed as mole percentages, where Me represents methyl and Vi represents vinyl:

| Unit | percent |
|---|---|
| $MeSiO_{1.5}$ | 3.5 |
| $Me_2ViSiO_{0.5}$ | 0.7 |
| $Me_3SiO_{0.5}$ | 2.8 |
| $Me_2SiO$ | 93.0 |

0.71 part of a dimethylhydrogensiloxy terminated polydimethylsiloxane (B); and
0.23 part one of the microencapsulated platinum compound referred to hereinabove, equivalent to 3 ppm of platinum.

The composition containing catalyst sample 1 cured within 3 days at room temperature.

The composition containing catalyst sample 2 that had been washed with cyclic polydimethylsiloxanes did not cure during storage for 300 days under ambient conditions. When the composition was heated at 45 degrees it required 12 days to cure. The same composition cured in less than five minutes when heated at 150 degrees C.

EXAMPLE 2

This example describes the preparation and evaluation of a platinum catalyst encapsulated within a layer of polymethyl methacrylate.

A reactor equipped as described in example 1 was charged with 300 cc. of water and 15 grams of the polyvinyl alcohol described in Example 1 and the contents of the reactor were stirred to obtain a homogeneous solution.

A solution prepared by blending 27.64 g. of polymethyl methacrylate, 250 cc of methylene chloride and 2.36 g. of a platinum catalyst was gradually added to the reactor to minimize foaming. The catalyst was a reaction product of hexachloroplatinic acid and sym-tetramethyldivinyldisiloxane and contained 4% platinum. Catalysts of this type are described in U.S. Pat. No. 3,419,353, which issued to Willing on Dec. 31, 1968.

The resultant mixture was stirred for about 16 hours while a stream of nitrogen was passed through the reactor. The microcapsules which formed were isolated and washed as described in Example 1. The capsules were found to contain 86 polymethyl methacrylate and 14 percent of the platinum compound, equivalent to 0.056 weight percent platinum.

A one-part curable organosiloxane composition was prepared by blending the following ingredients described in Example 1 to homogeneity.
32.0 parts of (A)
1.6 parts of (B)
0.052 part of polymethyl methacrylate microcapsules, equivalent to 3 ppm of platinum The composition did not cure during storage for 210 days under ambient conditions but cured in less than 15 minutes when heated at 150 degrees C.

EXAMPLE 3

This example describes the preparation and evaluation of a microencapsulated platinum catalyst of this invention where the encapsulant is a styrene/acrylonitrile copolymer.

To a reactor equipped as described in Example 1 and containing a solution prepared by blending 15 g. of the polyvinyl alcohol described in Example 1 with 300 cc. of water was gradually added a solution prepared by blending to homogeneity 27.64 g of a styrene/acrylonitrile copolymer available as Dow SAN 35% from the Dow Chemical Company, 2.37 g. of the platinum-containing catalyst described in Example 2 and 250 cc. of methylene chloride. The liquid in the reactor was stirred using a stirrer speed of 400 r.p.m. Following completion of the addition the contents of the reactor were stirred under ambient conditions for about 16 hours while the flow of nitrogen through the reactor was continued.

The microcapsules that formed were isolated by filtration, washed with methanol, filtered, and washed with cyclic polydimethylsiloxanes. The microcapsules were in the form of a fluffy powder with no detectable agglomeration. The microcapsules contained 96.2 percent of the acrylonitrile/styrene copolymer and 3.8 percent of the platinum compound, equivalent to 0.144 percent of platinum metal.

The microencapsulated catalyst was used to prepare an organosiloxane composition of the following composition, 33.15 g. of the polyorganosiloxane identified as (A) in Example 1

1.67 g. of the dimethylhydrogensiloxy terminated polydimethylsiloxane identified as (B) in Example 1, and 0.0561 g. of the microencapsulated catalyst prepared as described in the first part of the present Example 3. This composition did not cure during a 210 day exposure to ambient conditions but cured in less than 15 minutes when heated at a temperature of 150 degrees C.

EXAMPLE 4

This example demonstrates the effect of the relative amounts of encapsulant and platinum compound on the storage stability of curable organosiloxane compositions containing the microencapsulated platinum compound as a hydrosilation catalyst. The microcapsules were prepared by treating finely divided quartz with a platinum compound and coating the treated particles with an acrylonitrile/styrene copolymer in a fluidized bed reactor.

The platinum compound used was $(Et_2S)_2PtCl_2$. 20 grams of this compound and 10 grams of a dimethylvinylsiloxy terminated polydimethylsiloxane gum exhibiting a Williams plasticity value of about 60 were dissolved in sufficient toluene to form 950 cc. of solution. 1500 grams of finely divided quartz having an average particle size of 30 microns were introduced into this solution and blended to form a slurry. The toluene was then evaporated to yield a slightly yellowish powder.

The treated quartz powder was placed in the chamber of a fluidized bed reactor where it was suspended by means of a flow of heated air entering at the bottom of the chamber while being exposed to a spray of a solubilized copolymer containing 75 mole percent styrene units and 25 mole percent acrylonitrile units. The temperature of the air entering the reactor was 65 degrees C. and the temperature of the exiting air was 49 degrees C. The copolymer was applied as a 5 weight percent solution in a methylethyl ketone. The coating operation was discontinued when the copolymer constituted 30 or 70 percent by weight of the coated particles.

The capsules containing 30 percent by weight of the copolymer are identified as I and those containing 70 percent by weight of the copolymer are identified as II for the purposes of the following evaluation.

The curable organosiloxane compositions used to evaluate storage stability were prepared by blending the following ingredients to homogeneity:

50 parts of a dimethylvinylsiloxy endblocked polydimethylsiloxane having a viscosity of about 0.4 Pa.s at 25 degrees C., 50 parts of finely divided quartz with an average particle size of 5 microns, and 2.5 parts of a trimethylsiloxy endblocked polydiorganosiloxane having an average of five methylhydrogensiloxane units and three dimethylsiloxane units per molecule and containing from 0.7 to 0.8 weight percent of silica-bonded hydrogen atoms.

100 parts of this composition was blended to homogeneity with the quantity of microencapsulated catalyst A or B listed in the accompanying table and the resultant curable compositions were allowed to stand under ambient conditions. The time required for the compositions to cure is listed in the table.

| Catalyst type | PROPRIETARY | | Storage Stability |
| --- | --- | --- | --- |
| | Parts | Pt Concentration (ppm) | |
| A(control) | 0.55 | 10 | 3 days |
| B | 1.28 | 10 | 1 year |

These data indicate that for this particular polymer the coating should constitute more than 30 percent by weight of the encapsulated catalyst composition.

EXAMPLE 5

This example demonstrates the utility of the present microencapsulated platinum compounds as catalysts in a one part high consistency curable organosiloxane elastomer composition. The following ingredients were blended to homogeneity by passing them eight times through a two roll mill to form part A1 of a curable composition of this invention:

19.93 grams of an organosiloxane polymer composition and 0.7 gram of a microencapsulated platinum compound prepared as described for sample 2 in the preceding Example 1 and containing 10 percent by weight of the platinum-containing catalyst.

Part A2 was prepared in a similar manner using 20 grams of the organosiloxane polymer composition and 0.088 gram of a platinum compound encapsulated in an acrylonitrile/styrene copolymer. The catalyst was prepared as described in the preceding Example 3.

Part B or the curable composition was prepared by blending the following ingredients to homogeneity:

100 grams of the same organosiloxane polymer composition used to prepare part A1 and A2

2.0 grams of a trimethylsiloxy endblocked polydiorganosiloxane having an average of five methylhydrogensiloxane units and three dimethylsiloxane units per molecule and containing from 0.7 to 0.8 weight percent of silicon-bonded hydrogen atoms.

The organosiloxane polymer composition consisted essentially of 92.5 parts by weight of a dimethylvinylsiloxy terminated polydimethylsiloxane gum containing 0.12 mole percent of dimethylvinylsiloxy units and exhibiting a Williams plasticity of about 60 mils.

7.5 parts of a dimethylvinylsiloxy terminated dimethylsiloxane/methylvinylsiloxane copolymer containing 2 mole percent methylvinylsiloxane units, about 0.8 weight percent of vinyl radicals and exhibiting a Williams plasticity of about 60 mils.

8.0 parts of a hydroxyl endblocked polydimethylsiloxane fluid having a viscosity of about 0.04 Pa.s at 25 degrees C. and containing about 4 weight percent of silicon-bonded hydroxyl groups.

0.35 parts of a hydroxyl terminated diorganosiloxane copolymer wherein the repeating units consist essentially of dimethylsiloxane and methylvinylsiloxane units, and the copolymer contains about 10 weight percent of vinyl radical and about 16 weight percent of hydroxyl groups, and 38 parts of a fume silica having a nominal surface area of 250 m$^2$ per gram.

Two curable compositions were prepared by softening part A1 and A2 individually on a two-roll mill and then blending each material with an equal weight of the part B material using a two-roll mill. The curable composition containing part A1 was stored for eight months under ambient conditions, and the curable composition containing part A2 was stored for six months under the same conditions. At the end of the storage periods neither composition had cured. The compositions could be cured by heating them for several minutes at a temperature of 150 degrees C.

EXAMPLE 6

This example describes the preparation of a microencapsulated platinum compound by precipitating a coating of polystyrene followed by precipitation of a coating of cellulose acetate butyrate around a preferred platinum compound. The compound was obtained by reacting hexachloroplatinic acid and sym-tetramethyldivinyldisiloxane and diluting the reaction product with a liquid dimethylvinylsiloxy terminated polydimethylsiloxane to achieve a platinum content of 0.7 percent.

A reactor equipped with a mechanically operated stirrer and nitrogen inlet was charged with 300 cc. of water and 15 g. of the polyvinyl alcohol described in Example 1. This mixture was stirred until the polyvinyl alcohol dissolved, at which time a solution containing 5.33 g. of the platinum catalyst, 34.67 grams of polystyrene and 300 cc of methylene chloride was gradually added over a period of several minutes. Following completion of the addition the mixture in the reactor was stirred using a stirrer speed of 400 r.p.m. for two hour, at which time 2700 cc of water was added to reduce foaming. This mixture was stirred for 21 hours under ambient conditions while passing a stream of nitrogen through the reactor, after which the contents of the reactor were heated at 40 degrees C. for 5-½ hours while maintaining the flow of nitrogen.

The microcapsules were then isolated and combined with a mixture of cyclic polydimethylsiloxanes, a known solvent for the platinum catalyst, and stirred for two hours. The resultant capsules (I) contained 90 percent of polystyrene and 0.065 percent platinum.

Three grams of the polystyrene-coated microcapsules described in the first part of this example were suspended in a solution prepared by dissolving 3 g. of cellulose acetate butyrate, available as Tenite (R) butyrate from Eastman Chemical Company, in 150 g. of methanol. The resultant suspension was added to a reactor containing 250 g. of a trimethylsiloxy terminated polydimethylsiloxane exhibiting a viscosity of 500 Pa.s. The reactor was equipped as described in the first part of this example. The resultant mixture was heated at a temperature of 60 degrees C. and stirred for about 24 hours while passing a stream of nitrogen through the reactor. The microcapsules which formed during this period were isolated by filtration, washed with cyclic polydimethylsiloxanes and allowed to dry. The microcapsules are referred to hereinafter as II.

A one-part curable organosiloxane composition was prepared by blending the following ingredients to homogeneity 32.2 g. of the liquid polyorganosiloxane (A) described in the preceding Example 1, expressed as 1.62 grams of a dimethylhydrogensiloxy terminated polydimethylsiloxane; and 0.51 gram of the microencapsulated catalyst referred to as II hereinabove, equivalent to 4 ppm of platinum.

A portion of the resultant liquid curable composition was stored under ambient conditions, i.e a temperature of about 25 degrees C. for 210 days. No significant viscosity increase relative to the initial composition was observed at the end of this time period.

A second portion of the composition was stored for 12 days in an oven maintained at a temperature of 45 degrees C. and did not increase significantly in viscosity during this time period. The oven temperature was then increased to 70 degrees C. The composition cured in one day under these conditions.

A third portion of the composition was heated at a temperature of 150 degrees C. for 10 minutes, and was cured at the end of this period.

That which is claimed is:

1. A microencapsulated platinum-group metal or a compound thereof, in the form of a free flowing powder consisting essentially of microcapsules that, in turn, comprise said metal or compound as finely divided particles or droplets that are completely enveloped within one or an inner layer and an outer layer formed from thermoplastic organic polymers, the average diameter of said microcapsules is less than 500 microns, said thermoplastic organic polymers constitute at least 50 percent of the weight of said microcapsules, and said catalyst composition comprises a metal from the platinum group of the periodic table or a compound thereof.

2. A microencapsulated metal or compound according to claim 1 where the polymer constituting the inner layer is derived from at least one ethylenically unsaturated organic compound or a condensation reaction between at least two organic compounds containing a plurality of condensable groups per molecule, and the polymer constituting the outer layer is a cellulose ester.

3. A microencapsulated metal or compound thereof according to claim 2 where said inner and outer layers are formed by precipitation of a preformed polymer in the presence of said catalyst in the form of finely divided liquid droplets or finely divided solid particles.

4. A microencapsulated metal or compound thereof according to claim 3 where said inner layer is formed from polystyrene and said outer layer is formed from cellulose acetate butyrate.

5. A microencapsulated metal or compound thereof according to claim 2 where the thermoplastic polymer constituting said inner layer is formed in the presence of said catalyst in the form of a finely divided solid.

6. A microencapsulated metal or compound thereof according to claim 1 where said catalyst is the reaction product of a compound comprising a platinum atom and at least one halogen atom with an organosilicon compound, and said ethylenically unsaturated organic compound is selected from the group consisting of ethylenically unsaturated hydrocarbons, acrylonitrile, and esters of acrylic or methacrylic acid.

7. A microencapsulated metal or compound thereof according to claim 6 where said platinum compound is hexachloroplatinic acid and said organosilicon compound contains at least one ethylenically unsaturated hydrocarbon radical.

8. A microencapsulated metal or compound thereof according to claim 7 where said organosilicon compound is a hexaorganodisiloxane.

* * * * *